United States Patent
Mueller

(10) Patent No.: US 10,399,531 B2
(45) Date of Patent: Sep. 3, 2019

(54) MOTOR VEHICLE

(71) Applicant: Dr. Ing. h.c. F. Porsche Aktiengesellschaft, Stuttgart (DE)

(72) Inventor: Thomas Mueller, Leutenbach (DE)

(73) Assignee: Dr. Ing h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/297,352

(22) Filed: Oct. 19, 2016

(65) Prior Publication Data

US 2017/0113643 A1  Apr. 27, 2017

(30) Foreign Application Priority Data

Oct. 21, 2015 (DE) .................. 10 2015 117 900

(51) Int. Cl.
*B60R 21/213*  (2011.01)
*B60R 21/00*  (2006.01)

(52) U.S. Cl.
CPC .... *B60R 21/213* (2013.01); *B60R 2021/0009* (2013.01); *B60R 2021/0072* (2013.01)

(58) Field of Classification Search
CPC .............. B60R 21/213; B60R 2021/0072
See application file for complete search history.

(56) References Cited

U.S. PATENT DOCUMENTS

| 6,073,960 | A  * | 6/2000  | Viano    | B60R 21/231 |
|           |      |         |          | 280/730.1   |
| 6,106,000 | A  * | 8/2000  | Stewart  | B60R 21/20  |
|           |      |         |          | 280/728.2   |
| 6,382,660 | B1 * | 5/2002  | Starner  | B60R 21/213 |
|           |      |         |          | 280/728.2   |
| 6,808,198 | B2 * | 10/2004 | Schneider| B60R 21/237 |
|           |      |         |          | 280/730.1   |
| 6,938,918 | B2 * | 9/2005  | Viano    | B60R 21/213 |
|           |      |         |          | 280/730.1   |
| 7,380,815 | B2 * | 6/2008  | Rose     | B60R 21/213 |
|           |      |         |          | 280/728.2   |
| 7,850,197 | B2 * | 12/2010 | Zucal    | B60N 3/026  |
|           |      |         |          | 280/728.3   |
| 9,376,080 | B1 * | 6/2016  | Martinez | B60R 13/025 |
| 2001/0030415 | A1 | 10/2001 | Acker et al. | |
| 2001/0040364 | A1 * | 11/2001 | Viano | B60R 21/213 |
|           |      |         |          | 280/730.1   |
| 2002/0140209 | A1 * | 10/2002 | Waid | B60R 21/232 |
|           |      |         |          | 280/728.2   |

(Continued)

FOREIGN PATENT DOCUMENTS

DE   29611683 U1 *  9/1996  ............ B60J 7/1226
DE   198 43 11           3/2000

(Continued)

OTHER PUBLICATIONS

German Search Report dated Aug. 10, 2016.

*Primary Examiner* — Nicole T Verley
(74) *Attorney, Agent, or Firm* — Gerald E. Hespos; Michael J. Porco; Matthew T. Hespos

(57) ABSTRACT

A motor vehicle (1) has a supporting structure (3) that includes an A-pillar (5), and has a protective apparatus (8) that includes an inflatable airbag that can be inflated from a rest state into a deployed state by way of activation. The inflatable airbag is accommodated exclusively in the A-pillar (5) in the rest state.

4 Claims, 1 Drawing Sheet

(56) References Cited

U.S. PATENT DOCUMENTS

2005/0275199 A1    12/2005   Helmstetter
2008/0129023 A1     6/2008   Heigl et al.

FOREIGN PATENT DOCUMENTS

| | | | |
|---|---|---|---|
| DE | 200 06 927 | 10/2000 | |
| DE | 19931006 C1 * | 12/2000 | ............. B60R 21/00 |
| DE | 10021325 A1 * | 2/2001 | ....... B60R 21/23184 |
| DE | 20 2004 009 450 | 12/2004 | |
| DE | 10 2006 056 603 | 6/2008 | |
| DE | 10 2007 028 803 | 12/2008 | |
| DE | 102009005043 A1 * | 6/2009 | ........... B60R 21/231 |
| WO | 2005/118350 | 12/2005 | |

* cited by examiner

MOTOR VEHICLE

CROSS REFERENCE TO RELATED APPLICATION

This application claims priority under 35 USC 119 to German Patent Appl. No. 10 2015 117 900.8 filed on Oct. 21, 2015, the entire disclosure of which is incorporated herein by reference.

BACKGROUND

1. Field of the Invention

The invention relates to a motor vehicle having a supporting structure with an A-pillar, and having a protective apparatus that comprises an inflatable airbag that can be inflated from a rest state into a deployed state by way of activation. Furthermore, the invention relates to a method for operating a motor vehicle of this type.

2. Description of the Related Art

German utility model specification DE 20 2004 009 450 U1 discloses a protective apparatus for the driver of a motor vehicle having an airbag module with an inflatable airbag. The airbag module is arranged behind the dashboard of the vehicle, and the airbag extends in the deployed state in a space that is delimited substantially by the driver's door, the A-pillar and the steering wheel of the vehicle.

International publication WO 2005/118350 A1 discloses a protective device for the head and shoulder region of vehicle occupants in the case of a side or oblique impact. The device has an inflatable airbag that affords lateral impact protection in the inflated state, and has at least one tensioning strap that is guided over at least one deflection element and the ends of which are fixed at in each case one fastening point in a positionally fixed manner, a second fastening point being arranged adjacently with respect to an A-pillar of a vehicle body in the case of an inflated airbag.

German patent specification DE 10 2007 028 803 B4 discloses an airbag arrangement for a vehicle occupant restraining system, having at least one inflatable side airbag that, in the inflated state, extends at least in sections along a vehicle longitudinal side next to a seat for a vehicle occupant to be protected. The side airbag is integrated into the vehicle roof or into a vehicle door.

German laid-open specification DE 10 2006 056 603 A1 discloses a vehicle occupant restraining system having a side airbag arranged in a folded manner along a roof frame of a vehicle, a front inflatable section covering part of an A-pillar of the vehicle.

It is an object of the invention to improve the impact protection in a motor vehicle having a supporting structure which comprises an A-pillar, and having a protective apparatus with an inflatable airbag that can be inflated from a rest state into a deployed state by way of activation.

SUMMARY

The invention relates to a motor vehicle having a supporting structure that comprises an A-pillar, and has a protective apparatus that comprises an inflatable airbag that can be inflated from a rest state into a deployed state by way of activation. The inflatable airbag is accommodated exclusively in the A-pillar in the rest state. The accommodation of the inflatable airbag in the rest state exclusively in the A-pillar has proven advantageous in what is known as an oblique loading case. It can occur in the oblique loading case that a vehicle occupant, in particular a driver or front passenger of the motor vehicle, moves obliquely with respect to a vehicle longitudinal direction toward the A-pillar. The vehicle longitudinal direction is also called the x-direction.

The airbag may cover the A-pillar in the deployed state. As a result, safety requirements can be met in an improved manner in the oblique loading case. The airbag may be arranged between the A-pillar and an occupant of the motor vehicle in the deployed state. As a result, a movement of the occupant toward the A-pillar can be damped effectively and in a simple way.

The airbag may be activated in an oblique loading case and has a protective effect. In the case of an accident or crash, the airbag is activated, inflated and deployed, for example, by way of ignition of a gas generator.

The airbag may be accommodated in an airbag module in the A-pillar. In addition to the airbag, the airbag module may comprise a gas generator and a suitable ignition device.

The motor vehicles comprise two A-pillars, and an inflatable airbag may be accommodated in each A-pillar. As a result, sufficient protection for a driver and a front passenger of the motor vehicle in the oblique loading case is ensured in a simple way.

The motor vehicle may be an open top vehicle without a roof frame connected fixedly to the supporting structure. The accommodation of the inflatable airbag in the A-pillar has proven particularly advantageous. The motor vehicle may be a cabriolet. The cabriolet can be equipped with a folding roof and/or with a removable roof.

The invention also relates to a method for operating an above-described motor vehicle. The method includes inflating an airbag arranged between an occupant of the motor vehicle and the A-pillar in such a way that a movement of the occupant obliquely with respect to a vehicle longitudinal axis toward the A-pillar is damped by way of the inflated airbag. As a result, the occupant protection can be improved in a simple way.

The invention further relates to a protective apparatus, in particular an A-pillar, an airbag and/or an airbag module, for an above-described motor vehicle. The parts that are indicated can be handled separately.

Further advantages, features and details of the invention result from the following description, in which different exemplary embodiments are described in detail with reference to the drawing.

DETAILED DESCRIPTION

Figure 1:
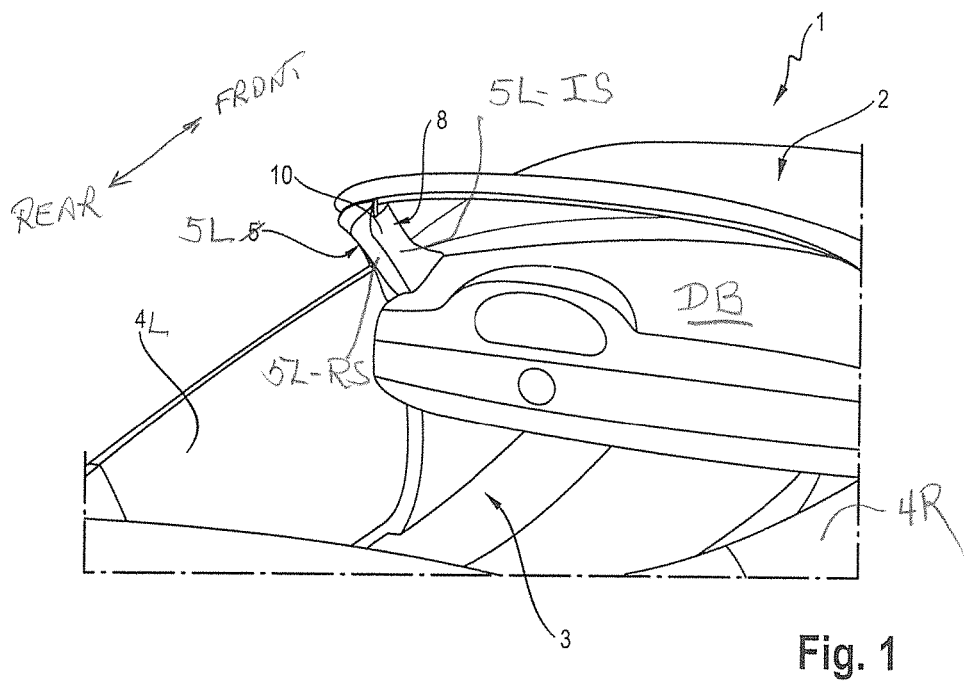
FIG. 1 is a perspective illustration of a motor vehicle having an A-pillar, in which an inflatable airbag is accommodated.
Figure 2:
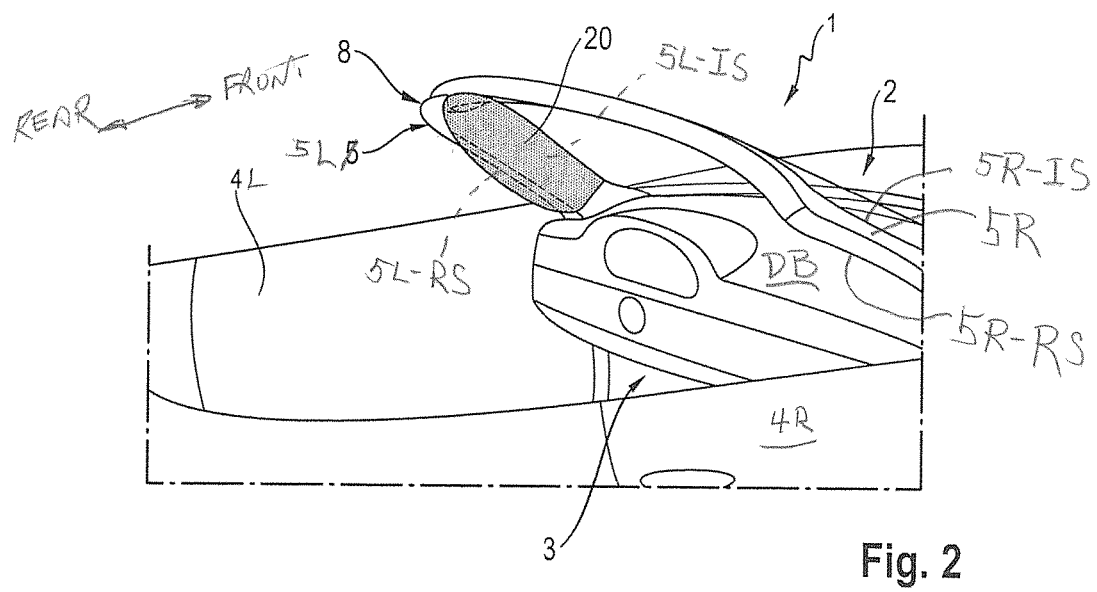
FIG. 2 is a similar illustration to FIG. 1 with the airbag in the deployed state.

FIGS. 1 and 2 are perspective views of a motor vehicle 1 having a vehicle front 2 with respect to a front-rear direction and a supporting structure 3. The supporting structure 3 comprises a driver's door 4L, a passenger's door 4R, left and right A-pillars 5L and 5R and a dashboard DB extending between the A-pillars 5L, 5R. The left A-pillar 5L has an inner side surface 5L-IS facing toward the right A-pillar 5R, and the right A-pillar 5R has an inner side surface facing toward the left A-pillar 5L. Additionally, the left and right A-pillars 5L and 5R are provided respectively with rear surfaces 5L-RS and 5R-RS facing toward the rear end of the motor vehicle 1.

A protective apparatus 8 having an airbag module 10 is integrated into the respective A-pillar 5L, 5R. The airbag module 10 comprises an airbag that is accommodated completely in the respective A-pillar 5L, 5R in the folded together state.

FIG. 2 shows the airbag 20 in its deployed state. After activation, in particular ignition of an ignition device of the airbag module 10, a gas generator inflates the airbag 20 in such a way that it deploys in front of the A-pillar 5, relative to the perspective view shown in FIG. 2.

The inflated airbag 20 advantageously is arranged between the respective A-pillar 5L, 5R and an occupant of the motor vehicle 1, in particular a driver of the motor vehicle 1. The motor vehicle 1 is a cabriolet without a roof frame. The motor vehicle 1 comprises, for example, a folding roof (not shown in the figures).

What is claimed is:

1. A motor vehicle extending in forward and backward directions and having an occupant compartment for accommodating at least one occupant, comprising:
   a supporting structure having left and right A-pillars obliquely forward of the occupant compartment towards an exterior of the motor vehicle;
   a dashboard extending between the left and right A-pillars;
   a protective apparatus including an airbag module housed completely in each of the A-pillars, and an inflatable airbag accommodated in the respective airbag module in a rest state, the airbag being inflatable into a deployed state; and
   the supporting structure being free of any structural element capable of impeding a deployment of the airbag obliquely rearward and toward a center of the occupant compartment so that the airbag in the deployed state covers the respective A-pillar from an inner side surface of the at least one A-pillar facing toward a center of the motor vehicle to a rear surface of the at least one A-pillar facing rearward on the motor vehicle, so that the respective airbag, in the deployed state, is arranged between the occupant compartment and the at least one A-pillar and with all of the deployed airbag being above the dashboard whereby a movement of the at least one occupant obliquely towards the A-pillar can be damped by the inflated airbag that covers from the inner side surface to the rear surface of the respective A-pillar.

2. The motor vehicle of claim 1, wherein the airbag is activated in an oblique loading case.

3. The motor vehicle of claim 1, wherein the motor vehicle is an open top vehicle without a roof frame connected fixedly to the supporting structure.

4. The motor vehicle of claim 1, wherein the motor vehicle is a cabriolet.

* * * * *